(12) United States Patent
Shah et al.

(10) Patent No.: US 8,433,160 B2
(45) Date of Patent: Apr. 30, 2013

(54) SMART FASTENER AND SMART INSERT FOR A FASTENER USING FIBER BRAGG GRATINGS TO MEASURE STRAIN AND TEMPERATURE

(75) Inventors: Nadir Shah, North Potomac, MD (US); William Keith Chandler, Lawrenceville, GA (US); Christopher Madsen, Gilbert, AZ (US); Donald R. Way, Scottsdale, AZ (US)

(73) Assignee: Cleveland Electric Laboratories, Twinsburg, OH (US)

( * ) Notice: Subject to any disclaimer, the term of this patent is extended or adjusted under 35 U.S.C. 154(b) by 328 days.

(21) Appl. No.: 12/693,663

(22) Filed: Jan. 26, 2010

(65) Prior Publication Data

US 2010/0329602 A1 Dec. 30, 2010

Related U.S. Application Data

(60) Provisional application No. 61/148,729, filed on Jan. 30, 2009, provisional application No. 61/222,261, filed on Jul. 1, 2009.

(51) Int. Cl.
*G02B 6/00* (2006.01)
(52) U.S. Cl.
USPC .................................. 385/12; 385/37; 73/800
(58) Field of Classification Search .................... 385/12, 385/37
See application file for complete search history.

(56) References Cited

U.S. PATENT DOCUMENTS

| | | | |
|---|---|---|---|
| 5,591,965 A | 1/1997 | Udd | |
| 5,828,059 A | 10/1998 | Udd | |
| 5,945,665 A * | 8/1999 | Hay | 250/227.14 |
| 6,310,997 B1 * | 10/2001 | Kato et al. | 385/37 |
| 6,490,931 B1 * | 12/2002 | Fernald et al. | 73/705 |
| 6,621,957 B1 * | 9/2003 | Sullivan et al. | 385/37 |
| 6,628,861 B1 * | 9/2003 | Yao | 385/37 |
| 2002/0009252 A1 * | 1/2002 | Maron et al. | 385/12 |
| 2002/0146230 A1 * | 10/2002 | So | 385/137 |
| 2002/0154860 A1 * | 10/2002 | Fernald et al. | 385/37 |
| 2003/0215185 A1 * | 11/2003 | Sirkis et al. | 385/37 |
| 2004/0013368 A1 * | 1/2004 | Gilliland et al. | 385/53 |
| 2004/0067002 A1 * | 4/2004 | Berg et al. | 385/12 |
| 2004/0237648 A1 * | 12/2004 | Jones et al. | 73/514.26 |
| 2006/0067616 A1 * | 3/2006 | Kanji et al. | 385/37 |
| 2007/0193362 A1 * | 8/2007 | Ferguson | 73/800 |
| 2007/0292078 A1 * | 12/2007 | Iwama | 385/24 |
| 2008/0019642 A1 * | 1/2008 | Kewitsch | 385/72 |

* cited by examiner

*Primary Examiner* — Hemang Sanghavi
(74) *Attorney, Agent, or Firm* — Roger Emerson; Emerson Thomson Bennett

(57) ABSTRACT

A measurement device including a fastener for use in attaching a first member to a second member, in which the fastener has an aperture extending through a length of the fastener, and a first optical fiber located within the aperture, in which the first optical fiber includes at least one fiber Bragg grating sensor. At least a portion of the first optical fiber can be secured within the aperture. A first end of the first optical fiber can be connected to an associated first optical connector and a second end of the first optical fiber can be connected to an associated second optical connector.

10 Claims, 11 Drawing Sheets

SMART FASTENER AND SMART INSERT FOR A FASTENER USING FIBER BRAGG GRATINGS TO MEASURE STRAIN AND TEMPERATURE

CROSS-REFERENCE TO RELATED APPLICATIONS

This application claims the benefit of U.S. Provisional Application No. 61/148,729 titled SMART FASTENER/ SMART INSERT, filed Jan. 30, 2009, and U.S. Provisional Application No. 61/222,261 titled SMART FASTENER AND SMART INSERT FOR A FASTENER USING FIBER BRAGG GRATINGS TO MEASURE STRAIN AND TEMPERATURE, filed Jul. 1, 2009.

I. BACKGROUND OF THE INVENTION

A. Field of Invention

This invention pertains to the methods and apparatuses related to monitoring the condition of structures and structural joints and more specifically to methods and apparatus related to measurement devices for measuring strain and temperature of structural joints.

B. Description of the Related Art

In any structure—a civil, mechanical, aerospace, or armored structure—joints react to extreme loading conditions and are susceptible to failure when subjected to intense loads, severe environments, and/or extended usage. One method to determine the condition of structures and structural joints is through strain measurement. One method of measuring strain is using fiber Bragg gratings.

Strain sensing using fiber Bragg gratings is known in the art. U.S. Pat. No. 5,828,059 titled "Transverse Strain Measurements Using Fiber Optic Grating Based Sensors" and issued to E. Udd, discloses a "system and method to sense the application of transverse stress." U.S. Pat. No. 5,591,965 titled "Multiparameter Sensor System Using a Multiple Grating Fiber Optic Birefringent Fiber" and issued to E. Udd, discloses a sensor "particularly useful for the measurement of three axes of strain and temperature at a single location in composite material." In a previous design, as shown in U.S. Pat. No. 5,945,665, titled "Bolt, Stud or Fastener Having an Embedded Fiber Optic Bragg Grating Sensor for Sensing Tensioning Strain" and issued to Hay, the fiber sensor has been secured into a fastener without pre-stressing the sensor. Data shown in FIG. 17 shows the inherent shift in load when an un-stretched sensor is unloaded. This shift in the data is unacceptable as it would be construed as actual load shift in the structure.

Therefore, what is needed is a method and apparatus that can monitor joints periodically or continuously for their condition to provide early warning of failure. In addition, what is needed is a method and apparatus with the capability to provide consistent data without hysteresis when unloaded. The present invention overcomes one or more of the disadvantages of the prior art. Furthermore, the strain sensing capabilities of the present invention are enhanced using advanced fiber Bragg grating techniques.

II. SUMMARY OF THE INVENTION

The present invention pertains to a measurement device and method that provides an indication of fastener deformation by monitoring strain during fastener installation and loading of the fastened structure. The measurement device can be used to accurately monitor fastener strain during installation of a fastener (for example, bolt preload strain) and to monitor structural strain under load when the fastener is used to connect structural joints. The measurement device can be monitored periodically or continuously to provide early warning of failure. A plurality of measurement devices at a given joint or at multiple joints enhances failure prediction and provides more accurate assessment of structural health.

Fiber Bragg gratings are sensitive to mechanical strain and therefore are useful as strain sensors in the measurement device. When fiber Bragg gratings intercept light traveling through the fiber, they reflect very narrow bands of wavelengths. The optical fiber, containing one or more fiber Bragg gratings, is threaded through a centrally bored fastener and bonded to the walls of the aperture with adhesive such that the fiber Bragg grating responds to the fastener strain. When the fastener-contained fiber Bragg grating is connected through its optical fiber to a suitably calibrated wavelength-interrogation instrument, observers can continuously or intermittently monitor fastener strain. Observers can continuously or intermittently monitor fastener strain remotely, as far as several kilometers from the fastener location.

According to one embodiment of this invention, the measurement device includes: a fastener for use in attaching a first member to a second member, in which the fastener has an aperture extending through a length of the fastener; and a first optical fiber located within the aperture, in which the first optical fiber includes at least one fiber Bragg grating sensor. At least a portion of the first optical fiber can be secured within the aperture. A first end of the first optical fiber can be connected to an associated first optical connector and a second end of the first optical fiber can be connected to an associated second optical connector. According to another embodiment, the first end of the first optical fiber is secured near a first end of the aperture and the second end of the first optical fiber is secured near a second end of the aperture. The measurement device may further include: a first optical connector attached to the first end of the first optical fiber, in which the first optical connector secures the first end of the first optical fiber; and a second optical connector attached to the second end of the first optical fiber, in which the second optical connector secures the second end of the first optical fiber. According to another embodiment, at least a portion of the first optical connector is located within the aperture near a first end of the fastener and at least a portion of the second optical connector is located within the aperture near a second end of the fastener. According to another embodiment, the first optical fiber is secured within the aperture in a pretensioned condition. According to another embodiment, the aperture extends through an entire length of the fastener, and the first end of the first optical fiber is secured near a first end of the fastener and the second end of the first optical fiber is secured near a second end of the fastener. According to another embodiment, the first end of the first optical fiber is secured to a first end of the aperture, and the second end of the first optical fiber is secured to a second end of the aperture, and the aperture is substantially filled with one or more of a gas, fluid, or gel. The measurement device may further include: a second fastener for use in attaching a first member to a second member, in which the second fastener has an aperture extending through a length of the second fastener; and a second optical fiber located within the aperture, in which the second optical fiber includes at least one fiber Bragg grating sensor; in which at least a portion of the second optical fiber can be secured within the aperture. A first end of the second optical fiber can be connected to an associated third optical connector and a second end of the second optical fiber can be connected to an associated fourth optical connector. According to another embodiment, the first optical fiber is operatively connected to the second optical fiber.

According to another embodiment of this invention, a measurement device includes: a housing for use with an associated fastener, in which the housing has an aperture extending through a length of the housing; and an optical fiber located within the aperture, in which the optical fiber includes at least one fiber Bragg grating sensor. At least a portion of the first optical fiber can be secured within the aperture. A first end of the first optical fiber can be connected to an associated first optical connector and a second end of the first optical fiber can be connected to an associated second optical connector. According to another embodiment, the first end of the first optical fiber is secured near a first end of the aperture and the second end of the first optical fiber is secured near a second end of the aperture. The measurement device may further include: a first optical connector attached to the first end of the first optical fiber, in which the first optical connector secures the first end of the first optical fiber; and a second optical connector attached to the second end of the first optical fiber, in which the second optical connector secures the second end of the first optical fiber. According to another embodiment, at least a portion of the first optical connector is located within the aperture near a first end of the housing and at least a portion the second optical connector is located within the aperture near a second end of the housing. According to another embodiment, the first optical fiber is secured within the aperture in a pre-tensioned condition. According to another embodiment, the aperture extends through an entire length of the housing, and the first end of the first optical fiber is secured near a first end of the housing and the second end of the first optical fiber is secured near a second end of the housing. According to another embodiment, the first end of the first optical fiber is secured to a first end of the aperture, and the second end of the first optical fiber is secured to a second end of the aperture, and the aperture is substantially filled with one or more of a gas, fluid, or gel. The measurement device may further include: a second housing for use with an associated fastener, in which the second housing has an aperture extending through a length of the housing; and a second optical fiber located within the aperture, in which the second optical fiber includes at least one fiber Bragg grating sensor. At least a portion of the second optical fiber can be secured within the aperture. A first end of the second optical fiber can be connected to an associated third optical connector and a second end of the second optical fiber can be connected to an associated fourth optical connector. According to another embodiment, the first optical fiber is operatively connected to the second optical fiber.

According to another embodiment of this invention, the measurement device includes: a fastener for use in attaching a first member to a second member, in which the fastener has an aperture extending through a length of the fastener; and a first optical fiber located within the aperture, in which the first optical fiber includes at least one fiber Bragg grating sensor. At least a portion of the first optical fiber can be secured within the aperture. According to another embodiment, the at least one fiber Bragg grating sensor is pre-tensioned when the first optical fiber is secured within the aperture. According to another embodiment, the first end of the first optical fiber is secured near a first end of the aperture and the second end of the first optical fiber is secured near a second end of the aperture. According to another embodiment, the aperture extends through an entire length of the fastener, and wherein the first end of the first optical fiber is secured near a first end of the fastener and the second end of the first optical fiber is secured near a second end of the fastener. According to another embodiment, the at least one fiber Bragg grating sensor is a dual over-written fiber Bragg grating. According to another embodiment, the first optical fiber is a birefringent optical fiber.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
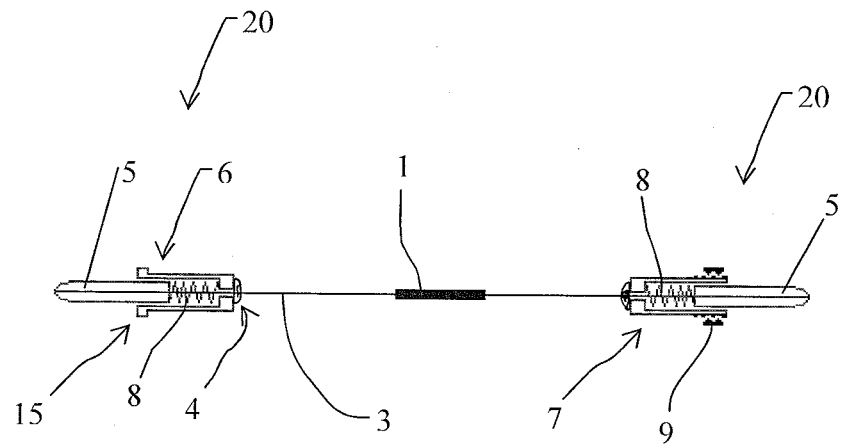
FIG. 1 is a diagram of optical elements according to one embodiment.
Figure 2:
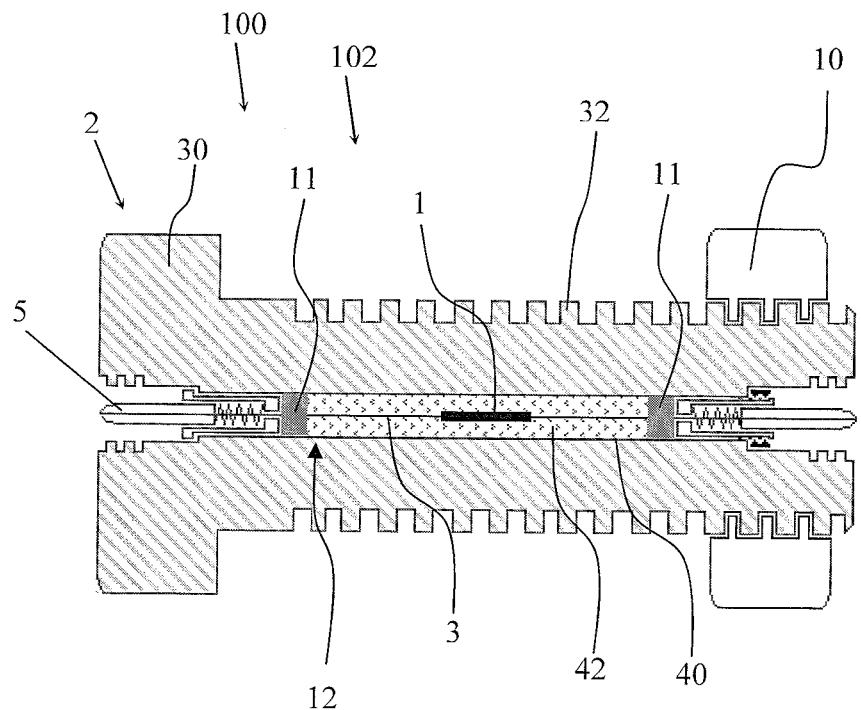
FIG. 2 is a side cut-away view of a measurement device according to one embodiment.
Figure 4:
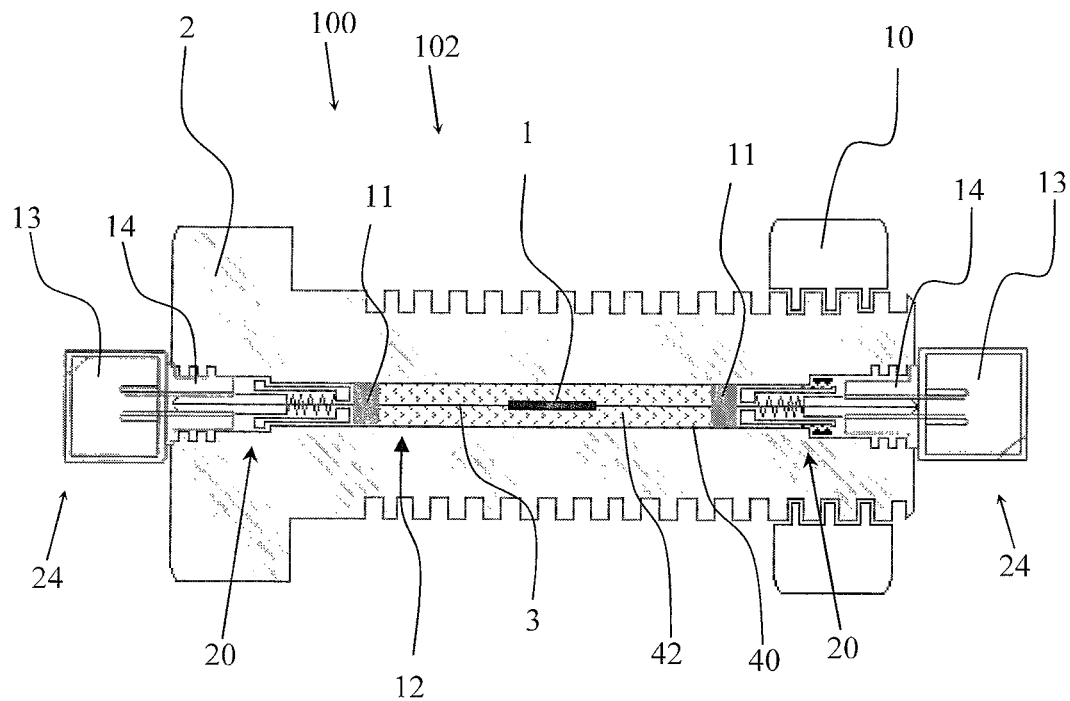
FIG. 4 is a diagram of one embodiment of a measurement device connected at both ends with the optical adapter of FIG. 3.
Figure 6A:
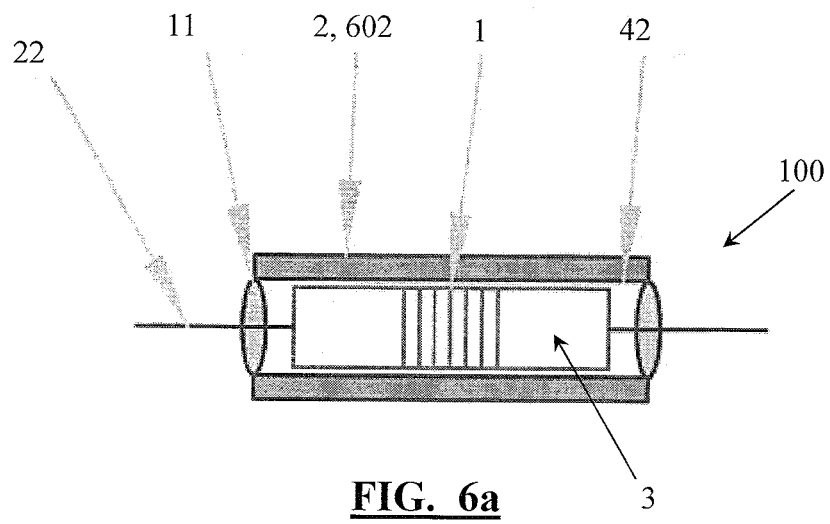
FIG. 6a is a schematic cross section view of a measurement device with a single FBG grating un-encapsulated.
Figure 6B:
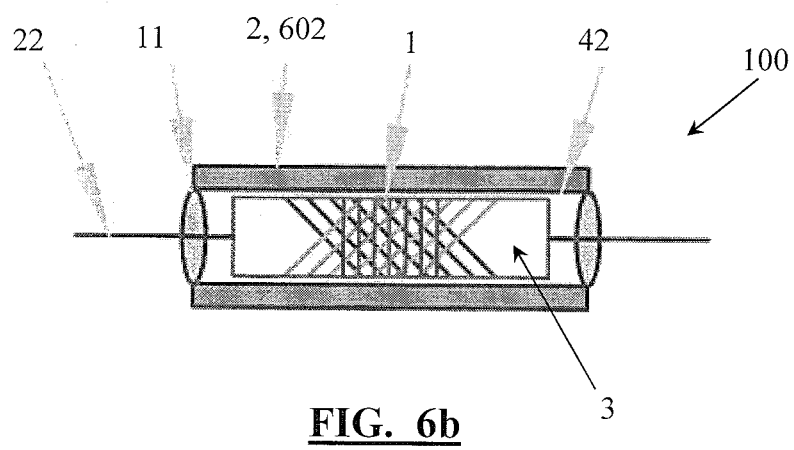
FIG. 6b is a schematic cross section view of a measurement device with a multi-grid FBG un-encapsualted.
Figure 6C:
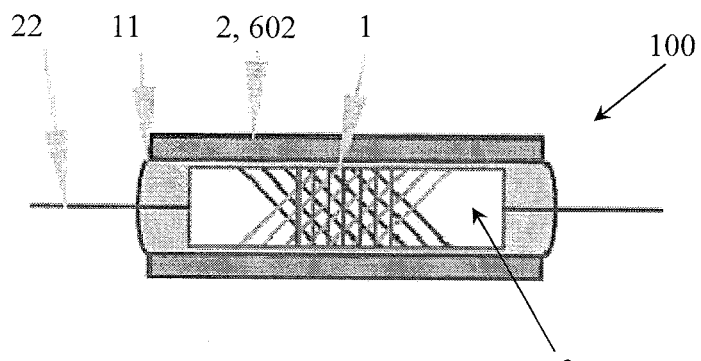
FIG. 6c is a schematic cross section view of a measurement device with a multi-grid FBG encapsulated.

Referring now to the drawings wherein the showings are for purposes of illustrating embodiments of the invention only and not for purposes of limiting the same, and wherein like reference numerals are understood to refer to like components, FIG. 1 shows a measurement device 100 according to one embodiment, and FIG. 2 shows a measurement device 100 according to another embodiment, also entitled a Smart Fastener 102. The measurement device 100 may include a fastener 2. The fastener 2 can be any device for attaching a first member to a second member including the following non-limiting examples: a bolt, rivet, stud, screw, or any other fastening device chosen with ordinary skill in the art. The measurement device 100 may include an optical fiber 3. In one embodiment, the optical fiber 3 is less than one millimeter in diameter. In another embodiment, the optical fiber 3 is a birefringent optical fiber. The measurement device 100 may include one or more fiber Bragg gratings (FBGs) 1 that are optically written or etched onto the optical fiber 3. The FBG's may be optically written or etched onto the optical fiber 3 at 45° angles from the bolt axis. The measurement device 100 may include an optical connector 20 at one end or both ends of the optical fiber 3. The optical connector 20 may include either an optical connector body 6 with a collar 15 or an optical connector body 7 without a collar. The optical connector bodies 6, 7 may include a sealant 4 to prevent the optical connector 20 from freezing. The optical connectors 6, 7 may also include an optical connector ferrule 5 and a spring 8 to facilitate a connection with an optical adapter 24, as shown in FIG. 4. The optical connector 7 without the collar may include a collar nut 9 to secure the measurement device 100 within the fastener 2. A portion of the optical fiber 3 may be located outside of the fastener 2 and be covered with one or more protective sheaths, such that this external section of the fiber is an optical cable 22. The optical fiber 3 with the fiber Bragg grating strain sensor 1 is embedded within an aperture 12 of the fastener 2 with an adhesive 11. According to one embodiment, as shown in FIGS. 2 and 4, the adhesive 11 is utilized to bond the fiber 3 near each end of the aperture 12. The fiber 3 is first bonded near one end of the aperture 12 using the adhesive 11. The fiber 3 is then precisely pre-stretched and bonded near the second end of the aperture 12 using the adhesive 11. The fiber is now free to "float" within the aperture in a pre-stressed state without influences from fastener necking, which may cause hysteresis during load reduction. Other bonding options using the adhesive 11 are shown in FIGS. 6a, 6b, and 6c, and further discussed below. The adhesive 11 may be any strain transmitting material, which can bond the optical fiber 3 with the fiber Bragg grating strain sensor 1 within the aperture 12. In one embodiment, the adhesive 11 is an epoxy. The aperture 12 may also include a gas, fluid, gel, or solid material 42.

With continuing reference to FIGS. 1 and 2, the aperture 12 maybe an opening in the center of the fastener 2 that extends at least partially into the fastener 2. In one embodiment, a bolt 2 has a head 30 at one end, a shaft extending from the head 30, threads 32 at the other end defined along at least a portion of the shaft, and a central bore 12 extending through the entire length of bolt 2. The fiber Bragg grating 1 within the bolt 2 responds to the tensioning force applied to the bolt 2 between the head 30 of the bolt 2 and a nut 10 that is threaded onto the threads 32 of the bolt 2, thereby creating a tensioning strain on the wall 40 of the central bore 12. The tensioning strain stretches the attached fiber Bragg grating 1 and thereby increases its characteristic reflected wavelength according to principles well known in the fiber Bragg grating art. As shown in FIG. 2, the threads 32 and the fiber Bragg grating 1 overlap one another along the shaft. Conversely, because of the pre-tensioning process, relaxation of bolt tension reduces strain, thereby reducing the value of the characteristic wavelength of the fiber Bragg grating 1. Further, application or relaxation of shear stresses on the bolt 2 likewise results in a degree of stretching or relaxation of the fiber Bragg grating 1 and a consequent shifting of its characteristic reflected wavelength. Because the example bolt 2 has a central bore 12 through the entire connector and optical connectors 20 are installed at both ends of the measurement device 100, the strain force can be measured from either end of the bolt 2.

Figure 3:
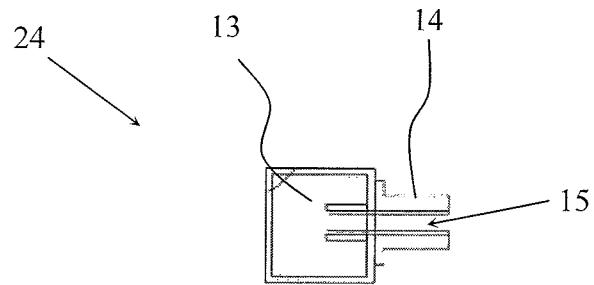
FIG. 3 is a diagram of an optical adapter according to one embodiment.
Figure 5:
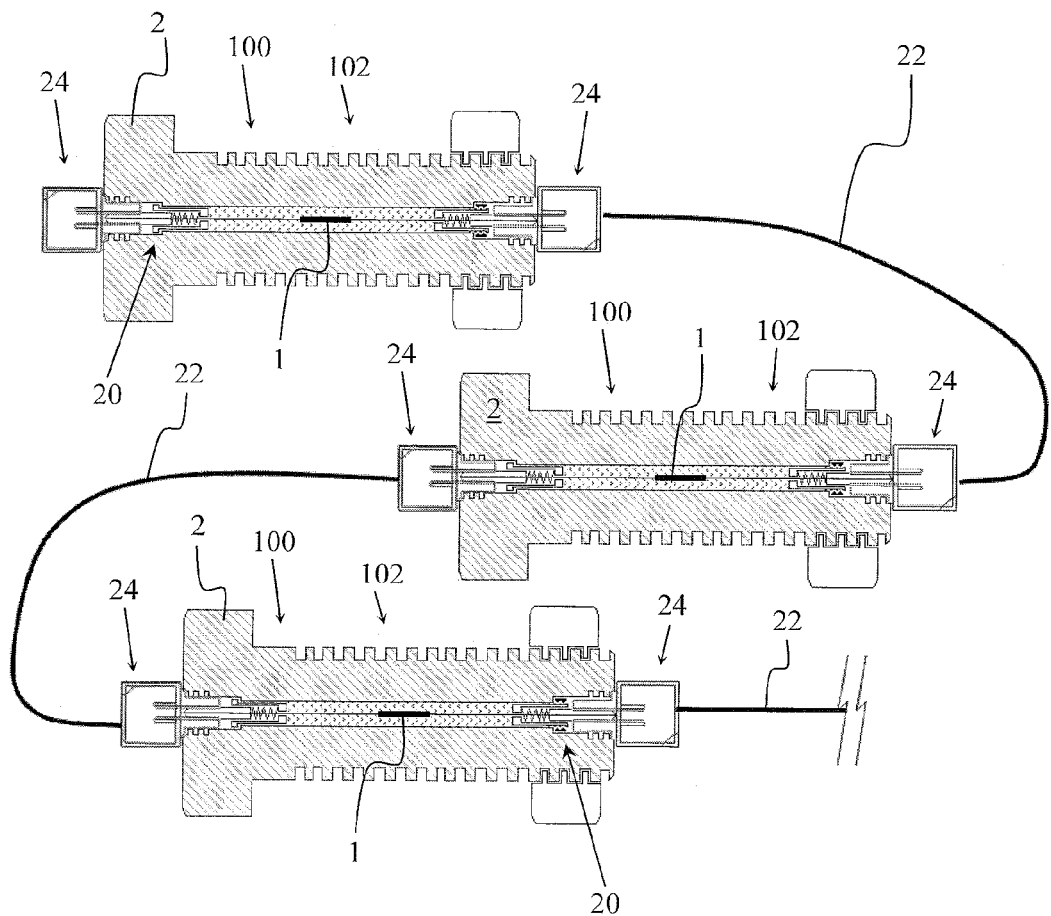
FIG. 5 is a diagram of a plurality of measurement devices connected in a series configuration.

With reference now to FIGS. 3 and 4, the measurement device 100 may include an optical adapter 24 for connection of the measurement device 100 to a fiber Bragg grating interrogator (not shown). In one embodiment, one end of the measurement device 100 includes an optical connector 20 with an optical adapter 24 attached. In another embodiment, each end of the measurement device 100 includes an optical adapter 24 connected to the respective optical connector 20. By connecting both ends of the fiber Bragg grating 1 to a fiber Bragg grating interrogator, this allows redundancy and, as well, facilitates connection of a plurality of fasteners 2 to a single optical cable 22, as shown in FIG. 5. The optical adapter 24 may include an LC connector adapter body 13, as is well known in the art. The optical adapter 24 may also include a modified LC connector adapter body 14 having a split sleeve 15 for connecting the optical adapter to the optical connector 20. The modified LC connector adapter body 14 is sized to fit within the aperture 12 of the fastener 2. The split sleeve 15 is sized to fit around the optical connector ferrule 5. The interaction of adapter body 14 with the wall 40 of the aperture and the interaction of the split sleeve 15 with the optical connector ferrule 5 connects the optical adapter 24 to the optical connector 20.

With reference now to FIG. 5, the measurement device 100 may have optical connectors 20 at both ends, which allows a plurality of Smart Fasteners 102 to be connected in a series formation on single optical fiber cable 22. As shown by FIGS. 1 and 5, substantially a full length of both of the optical connectors 20 can be positioned within the aperture 12. FIG. 5 also shows that the plurality of fasteners 102 can be rectilinearly spaced from one another. With this configuration, a plurality of fasteners 2 can be monitored simultaneously at any given joint or at multiple joints 15 on a structure, thereby monitoring the joint or joints and enhancing accuracy of information and predictability of structural health. Each fiber Bragg grating 1 reflects light at a distinctive wavelength, thereby allowing interrogation of the plurality of gratings on a single fiber using a technique called wavelength-division multiplexing (WDM)—a technique that is well established in the fiber Bragg grating art. With the optional 45° gratings, the torsional load can be accurately 20 measured as well.

Figure 7A:
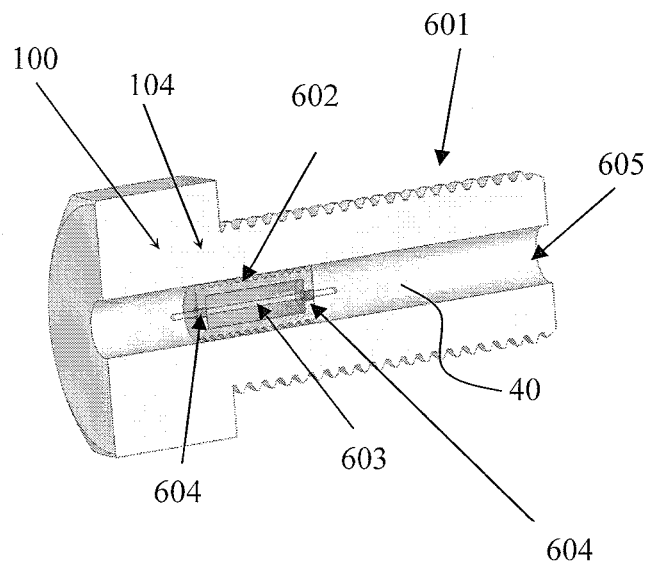
FIG. 7a is a schematic cross section view of a measurement device according to one embodiment.
Figure 7B:
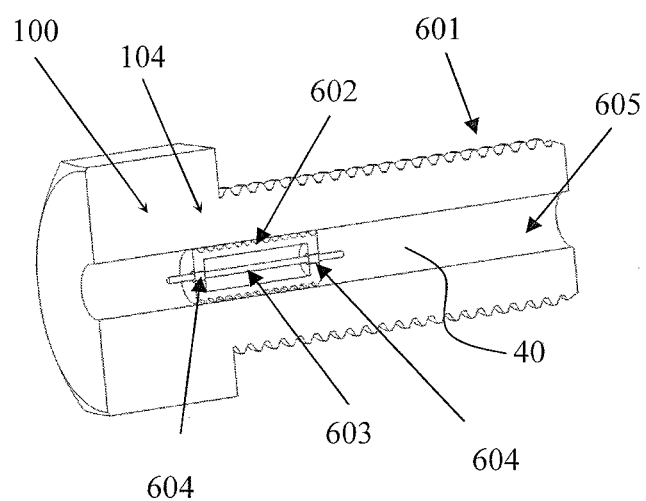
FIG. 7b is a schematic cross section view of a measurement device according to one embodiment.

With reference now to FIGS. 6a, 6b, and 6c, the measurement device 100 is shown with different installations of the fiber Bragg gratings 1. In one embodiment, as shown in FIG. 6a, the measurement device 100 includes a single fiber Bragg grating 1 on a birefringent optical fiber 3. The adhesive 11 is used to bond the fiber 3 to an opening on one side of the aperture in the fastener 2 of the Smart Fastener 102, as shown in FIGS. 2 and 4, or the cavity in the housing 602 of the Smart Insert 104, as shown in FIGS. 7a and 7b. The fiber 3 is then precisely pre-stretched and the adhesive 11 is then bonded to the opposite end of the aperture or cavity. The aperture or cavity may also include a gas, fluid, gel, or solid material 42. With the adhesive 11 located only at the ends of the aperture or cavity, the fiber Bragg grating 1 is referred to as un-encapsulated. The fiber is now free to "float" within the aperture in a pre-stressed state without influences from fastener necking, which may cause hysteresis during load reduction. This configuration is utilized to measure strictly axial loads without any transverse or torsional effects. In another embodiment, shown in FIG. 6b, the measurement device 100 includes a multi-grid fiber Bragg grating 1 on a birefringent optical fiber 3. The adhesive 11 is used to bond the fiber 3 to an opening on one side of the aperture or cavity of the fastener 2 or housing 602. The fiber 3 is then precisely pre-stretched and adhesive 11 is then bonded to the opposite end of the aperture or cavity. The aperture or cavity may also include a gas, fluid, gel, or solid material 42. With the adhesive 11 located only at the ends of the aperture or cavity, the fiber Bragg grating 1 is referred to as un-encapsulated. This configuration is utilized to measure axial and torsional loads without any transverse load effects. In another embodiment, shown in FIG. 6c, the measurement device 100 includes a multi-grid fiber Bragg grating 1 on a birefringent optical fiber 3. The fiber 3 is precisely pre-stretched and then substantially the entire aperture or cavity if filled with adhesive 11. With the adhesive 11 located throughout substantially the entire aperture or cavity, the fiber Bragg grating 1 is referred to as encapsulated. This configuration is utilized to measure all loading forces, including axial, torsional, and transverse. This configuration can measure all these loading forces because the fiber sensor 3 is in fixed contact with the wall of the aperture or cavity.

With reference now to FIGS. 7a and 7b, the measurement device 100 is shown according to another embodiment, also entitled a Smart Insert 104. FIGS. 7a and 7b show a schematic cross section of a fastener 601 into which a Smart Insert 104 has been installed. The inventive principles can be employed directly in the fastener 601, as described above, or alternatively using a Smart Insert 104. The Smart Insert 104 is a self-contained fiber-optic sensing device that can be manufactured independently of the fastener 601 and then inserted and bonded into an aperture 605 in the fastener 601 before or after the fastener 601 is installed in its application. The Smart Insert 104 can be inserted into any type of fastening device chosen by one with ordinary skill in the art. In one embodiment, the fastener 601 is a bolt. The Smart Insert 104 may be inserted into an aperture 605 located in the fastener 601. The aperture 605 may be a shallow drilled cavity reaching a short distance beyond the head face of the fastener 601. Alternatively, the fastener 601 may be through-bored so that the aperture 605 extends the entire length of the fastener 601 to facilitate incorporation of the Smart Insert 104 into an array. The Smart Insert 104 may include a housing 602, which may be any commercially reproducible housing. The exterior of the housing 602 can be designed to fit into any standard thread sizes and then can be bonded in place; the threads may assist securing the Smart Insert 104 to the fastening device 601. However, threads are not necessary so long as the Smart Insert 104 is sufficiently bonded to the inner surface 40 of the fastening device 601 so that the Smart Insert 104 strains along with the fastening device 601. The housing 602 can vary in length and diameter depending on the applications.

With continuing reference to FIGS. 7a and 7b, the Smart Insert 104 may include a fiber Bragg grating (FBG) 603, which passes through the center of the Smart Insert 104. The inner cavity of the Smart Insert 104 needs to provide sufficient room for a fiber Bragg grating 603 to pass through. As shown in FIGS. 7a and 7b, the threads of the fastener 601 and the fiber Bragg grating 603 overlap one another along a length a shaft of the fastener 601. In one embodiment, the inner cavity of the Smart Insert 104 is a hollow cavity. The fiber 603 can be bonded with an appropriate filler material 11 if needed. Several bonding options are shown in FIGS. 6a, 6b, and 6c, and discussed above. The fiber Bragg grating 603 can have unidirectional or multidirectional strain-sensing properties, depending on the application. In one embodiment, the fiber Bragg grating 603 is preloaded in tension so that any possible reductions in strain can still be detected and the unload hysteresis is eliminated. The Smart Insert 104 may include a connector 604, which can be designed to facilitate the pre-tensioning of the fiber Bragg grating 603 within the sensor housing. The pigtails of the fiber Bragg grating 603 do not need to extend beyond the Smart Insert 104 as shown. The pigtails of the fiber Bragg grating 603 can be terminated at connectors 604 that are fastened to or integral with the Smart Insert 104, so long as the connectors 604 can interface with standard optical fibers, either directly or using an adapter. The connectors 604 can be designed to interface with an optical fiber or optical fiber cable, thereby allowing the Smart Insert 104 installation to be completely independent of the interfacing optical fiber/cable installation. The connectors 604 can also be incorporated in pairs, at both ends of the Smart Insert 104, allowing for an array of Smart Inserts 104 to be connected in series to the fiber Bragg grating interrogation device via a single optical-fiber pathway.

With reference now to all the FIGURES, both conventional and advanced strain sensing principles can be employed in both the Smart Fastener 102 and Smart Insert 104. In addition, longitudinal and transverse fiber optic strain measurement approaches are applicable to both the Smart Fastener 102 and the Smart Insert 104. While the principles described below are illustrated using drawings of Smart Fastener 102, the following principles apply equally well to the Smart Insert 104.

Figure 8:
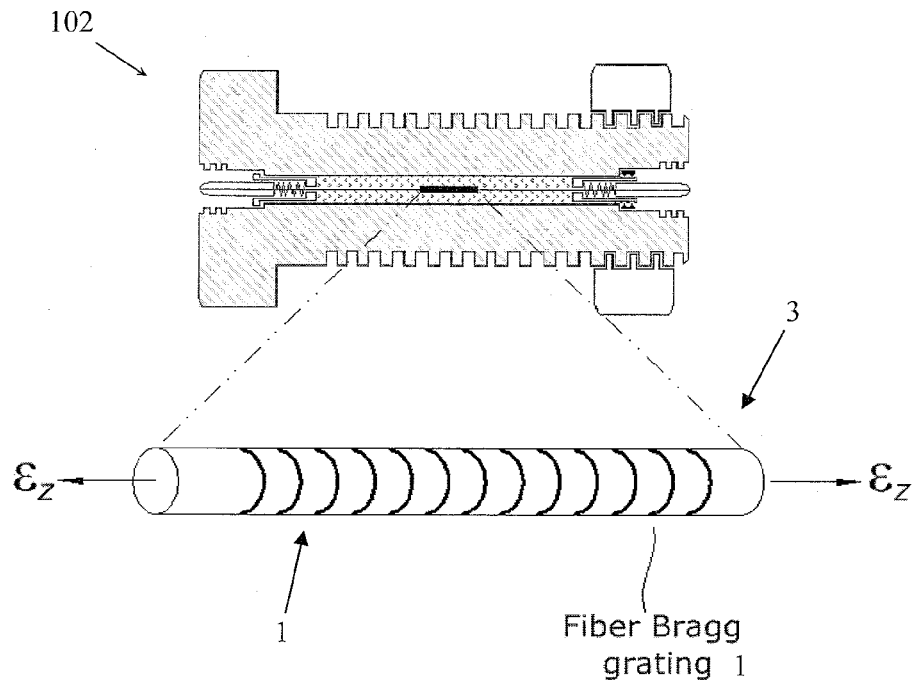
FIG. 8 is a close-up view of a fiber Bragg grating according to one embodiment.
Figure 9:
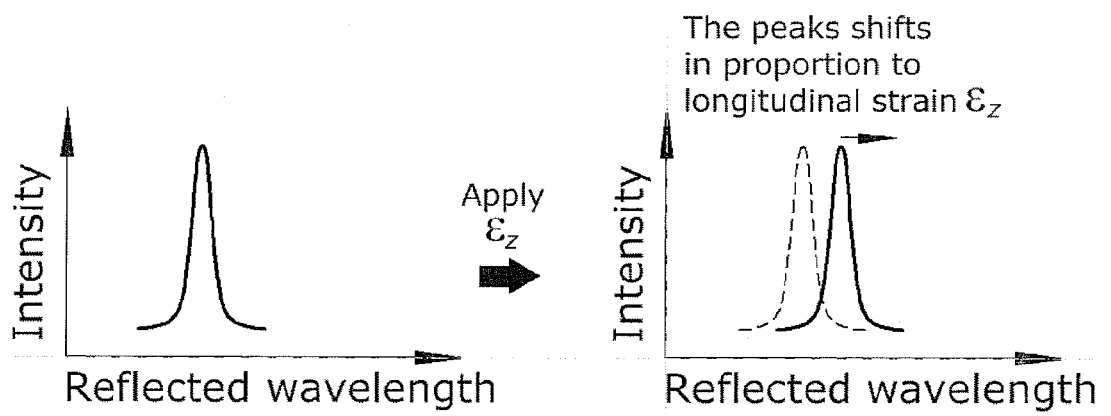
FIG. 9 is a graphical view of a shift in reflected wavelength from the fiber Bragg grating in FIG. 8 in response to longitudinal strain.

With reference now to FIGS. 8 and 9, the basic longitudinal strain measurement in a Smart Fastener 102 (or Smart Insert 104) with a single fiber Bragg grating 1 on standard (circularly symmetric) optical fiber 3 is illustrated. In the basic application of the Smart Fastener 102 (or Smart Insert 104), the Smart Fastener 102 employs a standard fiber Bragg grating 1 that stretches or relaxes with greater or lesser longitudinal strain along the axis of the fastener. Increasing strains may result from normal preloading of the fastener during installation or over-stressing or yield of the fastener. Decreasing strains may signal loosening or failure of the fastener. Such information is extremely valuable in assessing and/or monitoring the mechanical health of the structure to which the fastener is applied. FIGS. 8 and 9 illustrate employment of the fiber Bragg grating 1 to monitor longitudinal strain $\epsilon z$ in the fastener 102. As fastener strain stretches or relaxes the fiber Bragg grating 1, its characteristic resonant (Bragg) wavelength peak shifts. This shift is detectable using standard fiber optic interrogation techniques and instrumentation, such as the fiber Bragg grating interrogators (not shown) manufactured by Micron Optics Inc. This shift in peak wavelength is easily converted to strain, using equations well known in the art. In most applications, strain measurements need to be corrected for temperature shifts in the environment of the sensor. Such compensation is easily accomplished using a second unstrained, nearby fiber Bragg grating as a temperature sensor or a second unstrained "dummy" sensor mounted in or on the same material as used to fabricate the fastener—in both cases using well-established equations. A second unstrained fiber Bragg grating can be connected in series with the strain-measuring fiber Bragg grating 1, either within the fastener or external to it.

Figure 10:
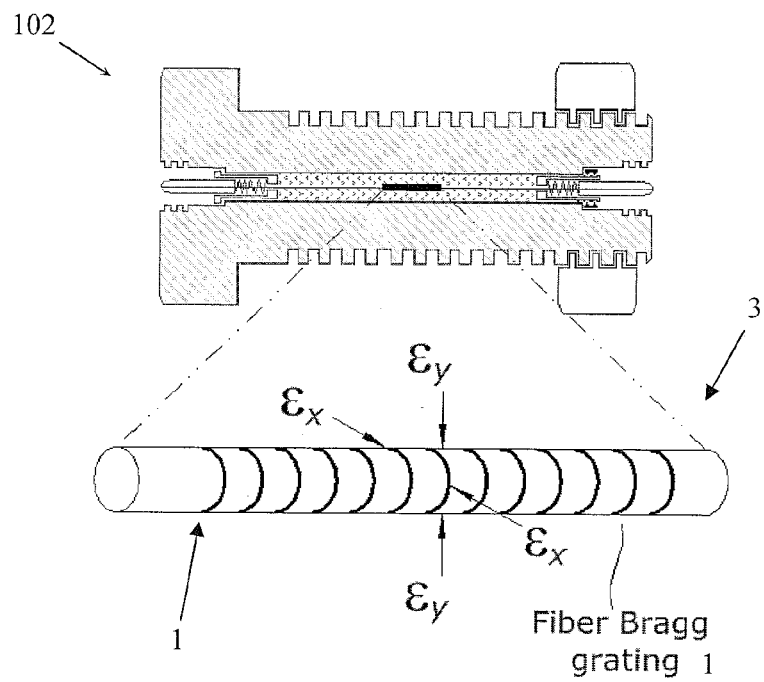
FIG. 10 is a close-up view of a fiber Bragg grating according to one embodiment.
Figure 11:
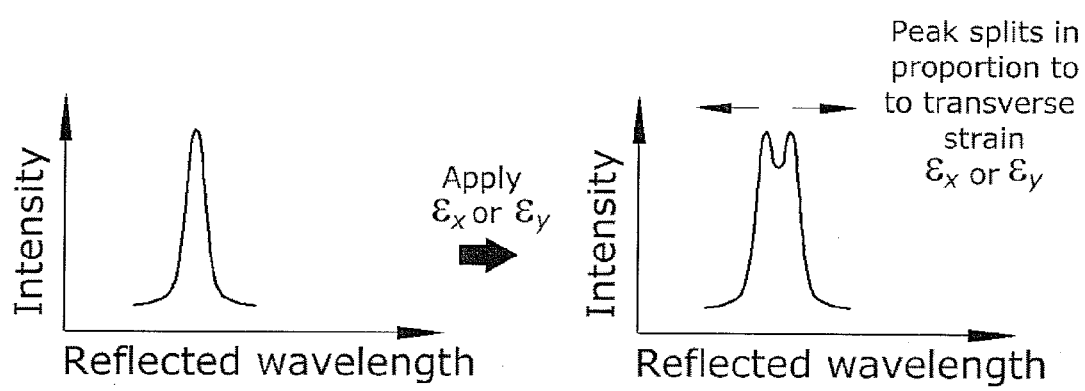
FIG. 11 is a graphical view of a shift in reflected wavelength from the fiber Bragg grating in FIG. 10 in response to transverse strain.

With reference now to FIGS. 10 and 11, the basic transverse strain measurement in a Smart Fastener 102 (or Smart Insert 104) with a single fiber Bragg grating 1 on standard (circularly symmetric) optical fiber 3 is illustrated. Application of a transverse strain—designated as $\epsilon x$ or $\epsilon y$ as shown in FIG. 10—to a standard, circularly symmetric fiber Bragg grating 1 induces birefringence in the direction of applied strain. The resulting non-uniformity in refractive index causes the fiber Bragg grating 1 to reflect two spectral peaks at slightly different wavelengths as shown in FIG. 11. The separation between the two peaks increases with increasing transverse strain. Therefore, with an ordinary circularly uniform fiber Bragg grating 1, the Smart Fastener 102 (or Smart Insert 104) can monitor transverse strains, such as caused by shear loads on the installed fastener.

Figure 12:
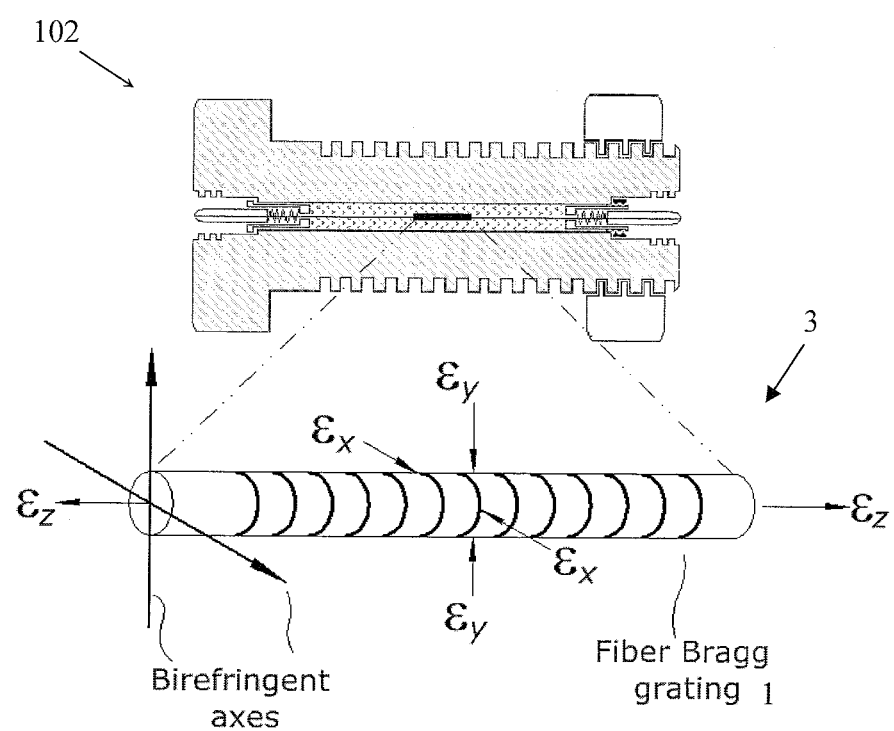
FIG. 12 is a close-up view of a fiber Bragg grating according to one embodiment.
Figure 13:
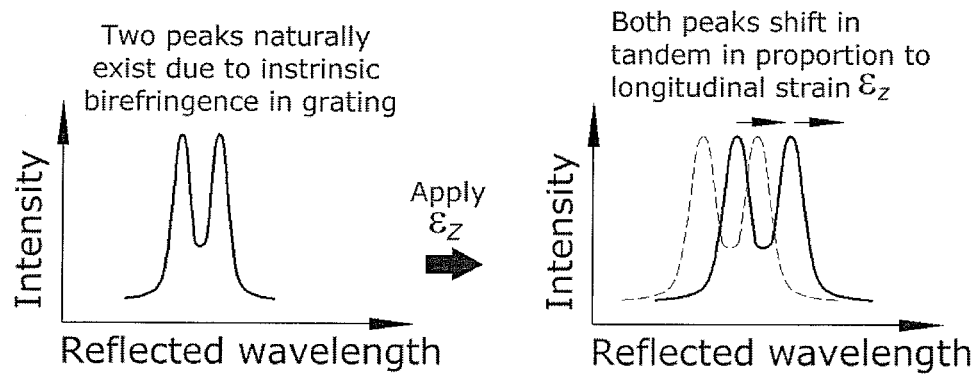
FIG. 13 is a graphical view of a shift in reflected wavelength from the fiber Bragg grating in FIG. 12 in response to longitudinal strain.
Figure 14:
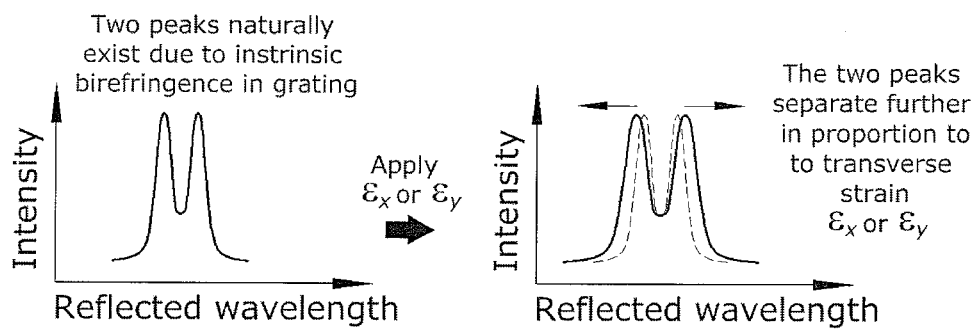
FIG. 14 is a graphical view of a shift in reflected wavelength from the fiber Bragg grating in FIG. 12 in response to transverse strain.

With reference now to FIGS. 12-14, transverse strain measurement in a Smart Fastener 102 (or Smart Insert 104) with single fiber Bragg grating 1 on birefringent optical fiber is illustrated. More advanced embodiments of the Smart Fastener 102 (or Smart Insert 104) can employ fiber Bragg gratings 1 that enhance detection and measurement of transverse strains. Separation of the split peaks induced by transverse strain in an ordinary, circularly symmetric fiber Bragg grating 1 may not very sensitive to changes in the transverse strain because small changes can get lost in signal noise. However, according to one embodiment as depicted in FIG. 12, the Smart Fastener 102 (or Smart Insert 104) can more sensitively monitor transverse strains in the fastener if the fiber Bragg grating 1 is written on a birefringent, polarization-maintaining fiber 3.

With continuing reference to FIGS. 12-14, a fiber Bragg grating 1 written on a birefringent fiber 3 intrinsically reflects two spectral peaks at two different wavelengths, as illustrated in FIGS. 13 and 14. Either peak or both of these peaks can be used to monitor longitudinal strain in the Smart Fastener 102 (or Smart Insert 104), because both peaks shift together when longitudinal strain $\epsilon z$ is applied as shown in FIG. 13. More importantly, the separation between the two peaks will increase with increasing Smart Fastener 102 (or Smart Insert 104) transverse strain $\epsilon x$ or $\epsilon y$, as shown in FIG. 14. Moreover, the separation per unit of applied transverse strain is notably larger for a birefringent-fiber grating than the induced peak separation shown previously in FIG. 11 for a circularly uniform grating. The birefringent-fiber grating can be spliced or connected to a standard, circularly symmetric communications-grade fiber and interrogated with an ordinary fiber Bragg grating interrogator with no loss of peak-position information. The user does not need to interrogate the fiber Bragg grating 1 with polarized light, and therefore polarization-maintaining-fiber connections are not required between the fiber Bragg grating 1 and the interrogator. Therefore, no special equipment is required to use a birefringent-fiber grating equipped Smart Fastener 102 (or Smart Insert 104). The Smart Fastener 102 (or Smart Insert 104) with the birefringent-fiber grating can be used in a standard structural health monitoring system with other fiber Bragg grating sensors, such as temperature sensors and surface-amount and embeddable strain sensors. The Smart Fastener 102 (or Smart Insert 104) with the birefringent-fiber grating can be connected to the same fiber/cable and interrogator as these other sensors.

Figure 15:
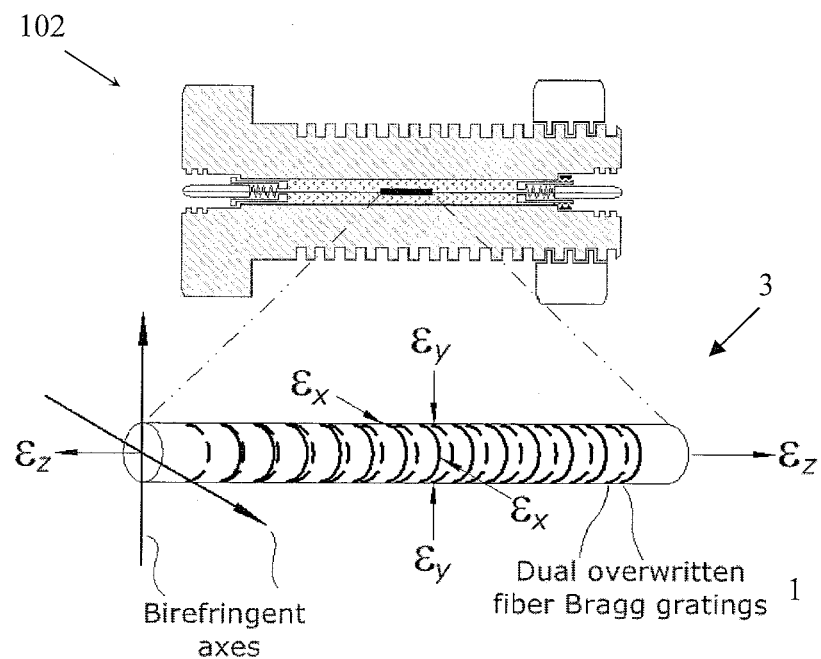
FIG. 15 is a close-up view of a fiber Bragg grating according to one embodiment.
Figure 16:
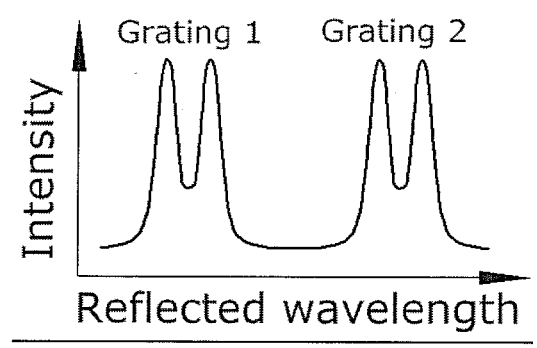
FIG. 16 is a graphical view of reflected wavelengths from the fiber Bragg grating in FIG. 15.
Figure 17:
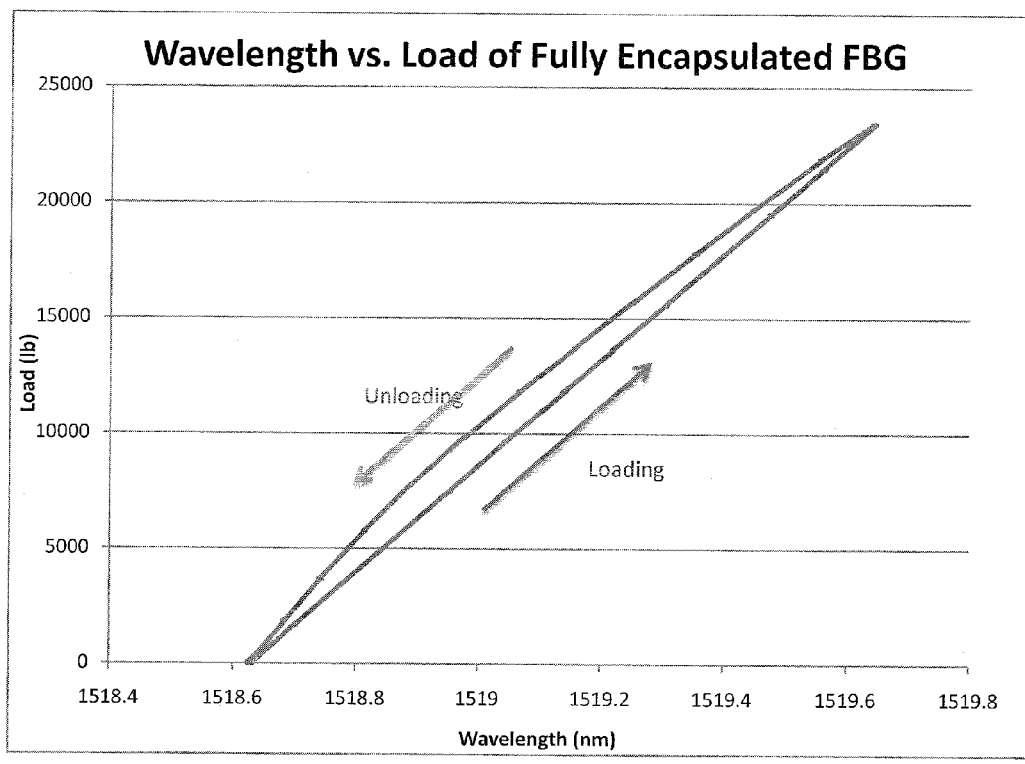
FIG. 17 is a graph of load versus wavelength that shows hysteresis for a fully encapsulated fiber Bragg grating that has not been pre-stressed during installation in a fastener.

With reference now to FIGS. 15 and 16, three-axis strain measurement and temperature measurement in a Smart Fastener 102 (or Smart Insert 104) with dual over-written fiber Bragg gratings 1 on birefringent optical fiber 3 is illustrated. In a still more advanced example of transverse strain sensing, the Smart Fastener 102 (or Smart Insert 104) can be equipped with a dual fiber Bragg grating 1 that has been written on birefringent optical fiber 3, as shown in FIG. 15. The two overwritten gratings are written so as to reflect two substantially separated pairs of spectral peaks, as shown in FIG. 16. The previously noted references illustrate writing of the two overlapping gratings to reflect at around 1300 nm and 1550 nm and teach that shifts of the four peaks can be inserted as variables into four equations and solved for the following four unknowns: strains along all three axes $\epsilon x$, $\epsilon y$, and $\epsilon z$, and temperature. Incorporation of such a fiber Bragg grating into the Smart Fastener 102 (or Smart Insert 104) will allow measurement of three dimensional strains in the equipped fastener. In addition, such incorporation will provide intrinsic temperature information that can be used to compensate the fiber Bragg grating 1 for temperature changes—thereby allowing the Smart Fastener 102 (or Smart Insert 104) to be used at various temperatures including, but not limited to, high temperatures.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:
1. A measurement device comprising:
 a fastener for use in attaching a first member to a second member, the fastener having an aperture extending through a length of the fastener;
 a first optical fiber located within the aperture, the first optical fiber including at least one fiber Bragg grating sensor;
 wherein at least a portion of the first optical fiber is secured within the aperture;
 wherein a first end of the first optical fiber can be connected to an associated first optical connector and a second end of the first optical fiber can be connected to an associated second optical connector;
 wherein the first end of the first optical fiber is secured near a first end of the aperture and the second end of the first optical fiber is secured near a second end of the aperture and at least portion of the first optical fiber between the first and second ends of the first optical fiber is unsecured relative to the aperture;
 a first optical connector attached to the first end of the first optical fiber, wherein the first optical connector secures the first end of the first optical fiber;
 a second optical connector attached to the second end of the first optical fiber, wherein the second optical connector secures the second end of the first optical fiber; and
 wherein substantially a full length of at least one of the first optical connector and the second optical connector is located within the aperture.

2. The measurement device of claim 1 wherein the aperture extends through an entire length of the fastener.

3. The measurement device of claim 1 further comprising:
 a second fastener for use in attaching and rectilinearly spaced from the first fastener, the second fastener having an aperture extending through a length of the second fastener;
 a second optical fiber located within the aperture of the second fastener, the second optical fiber including at least one fiber Bragg grating sensor; and
 wherein the first optical fiber is operatively connected to the second optical fiber.

4. The measurement device of claim 1 wherein the aperture is substantially filled between the first and second ends of the first optical fiber with one of a gas, fluid, and gel.

5. The measurement device of claim 1 wherein the fastener further comprises:
 a head;
 a shaft extending away from the head; and threads defined along at least a portion of the shaft, wherein the aperture extends through the shaft and the at least one fiber Bragg grating sensor and the threads overlap one another along the shaft.

6. The measurement device of claim 1 wherein substantially a full length of both of the first optical connector and the second optical connector are located within the aperture.

7. A measurement device comprising:
a housing for use with an associated fastener, the housing having an aperture extending through a length of the housing;
an optical fiber located within the aperture, the optical fiber including at least one fiber Bragg grating sensor;
wherein at least a portion of the first optical fiber is secured within the aperture;
wherein a first end of the first optical fiber can be connected to an associated first optical connector and a second end of the first optical fiber can be connected to an associated second optical connector;
wherein the first optical fiber is secured within the aperture in a pre-tensioned condition;
a fastener with a head, a shaft extending away from the head, threads defined along at least a portion of the shaft, and an aperture extending through the shaft, wherein the housing is disposed in the aperture of the fastener; and
wherein the housing further comprises externally-projecting threads comprises externally-projecting threads operable to engage the aperture of the fastener.

8. The measurement device of claim 7 wherein the first end of the first optical fiber is secured near a first end of the aperture and the second end of the first optical fiber is secured near a second end of the aperture and at least portion of the first optical fiber between the first and second ends of the first optical fiber is unsecured relative to the aperture.

9. The measurement device of claim 7 wherein the first end of the first optical fiber is secured to a first end of the aperture and the second end of the first optical fiber is secured to a second end of the aperture, and wherein the aperture is substantially filled with one of a gas, fluid, and gel between the first and second ends.

10. The measurement device of claim 7 wherein the housing and the threads overlap one another along a length of the shaft.

* * * * *